(12) United States Patent
Blanchard et al.

(10) Patent No.: US 12,184,137 B2
(45) Date of Patent: *Dec. 31, 2024

(54) MODULAR ELECTRICAL GENERATOR/ELECTRIC MOTOR ASSEMBLY, AND METHOD OF USING SAME

(71) Applicant: Edge Power Systems, LLC, Jennings, LA (US)

(72) Inventors: Eric J. Blanchard, Rayne, LA (US); Dennis L. Fontenot, Jr., Iota, LA (US)

(73) Assignee: EDGE POWER SYSTEMS, LLC, Jennings, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/408,841

(22) Filed: Jan. 10, 2024

(65) Prior Publication Data

US 2024/0146162 A1   May 2, 2024

Related U.S. Application Data

(63) Continuation of application No. 18/360,888, filed on Jul. 28, 2023, now Pat. No. 11,909,280.

(60) Provisional application No. 63/393,617, filed on Jul. 29, 2022.

(51) Int. Cl.
*H02K 16/04* (2006.01)

(52) U.S. Cl.
CPC ......... *H02K 16/04* (2013.01); *H02K 2213/12* (2013.01)

(58) Field of Classification Search
CPC ............................ H02K 16/04; H02K 2213/12
USPC .............................. 310/114, 156.35, 266–268
See application file for complete search history.

(56) References Cited

U.S. PATENT DOCUMENTS

2011/0109185 A1\* 5/2011 Sullivan ............... H02K 21/028
310/156.36

\* cited by examiner

*Primary Examiner* — Jose A Gonzalez Quinones
(74) *Attorney, Agent, or Firm* — Ted M. Anthony

(57) ABSTRACT

A modular device that can operate as an electrical generator. First and second coil support plates are arranged in parallel orientation relative to each other forming a gap between the first and second coil support plates. Removable C-cores, each having wire coils, are removably attached to the first and second coil support plates. A rotor disc having selectively arranged magnets is disposed in the gap between the first and second coil support plates and is permitted to rotate about an axis that is perpendicular to the rotor disc and the parallel first and second coil support plates; a drive motor can power rotation of the rotor disc. As the disc rotates, electrical current is generated. The C-core assemblies can be interchanged, checked, removed and/or replaced while the electrical generator remains in operation without requiring cessation of such operation.

20 Claims, 12 Drawing Sheets

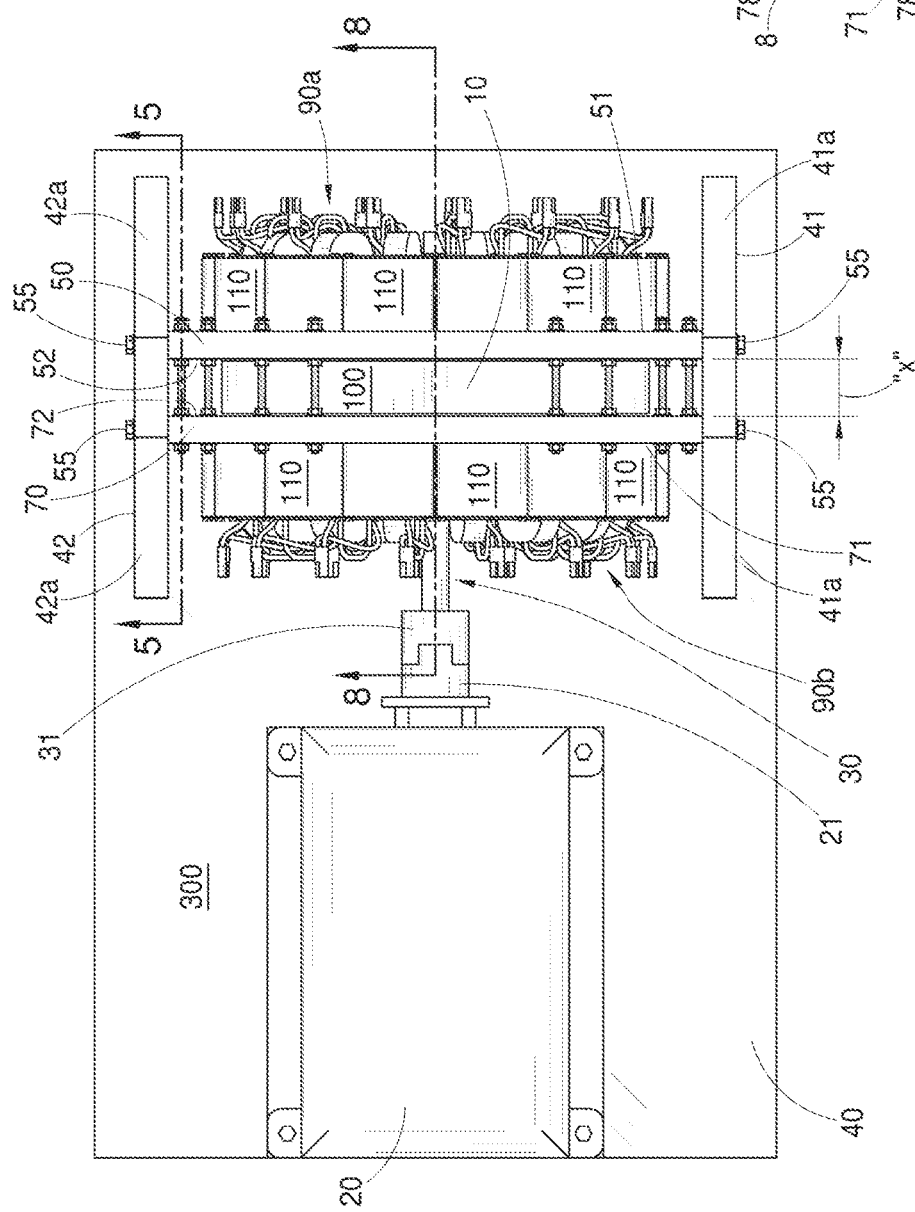
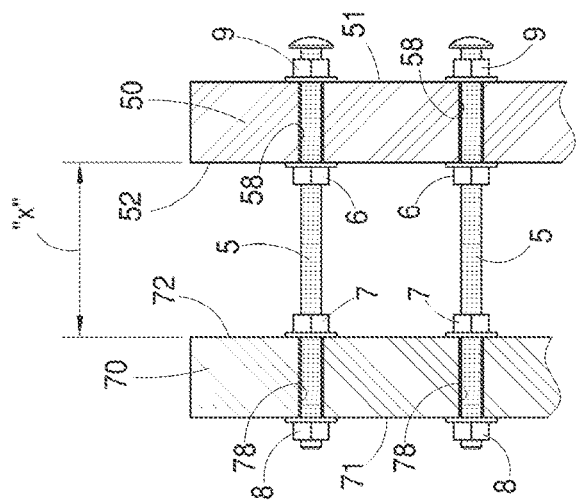

MODULAR ELECTRICAL GENERATOR/ELECTRIC MOTOR ASSEMBLY, AND METHOD OF USING SAME

BACKGROUND OF THE INVENTION

1. Field of the Invention

The present invention pertains to a device that can be used as an induction electrical generator or electric motor. More particularly, the present invention pertains to an electrical generator/electric motor having a plurality of stationary coils and at least one rotor. More particularly still, the present invention pertains to a modular electrical generator/electric motor having a plurality of distributed "C-core assemblies" and at least one rotor, wherein said C-core assemblies can be removed and/or replaced without interrupting operation of said electrical generator/electric motor.

2. DESCRIPTION OF RELATED ART

A generator is a device that converts motive power or kinetic energy (such as mechanical energy) or fuel-based power (chemical energy) into electricity, or electrical potential energy, typically used to power external electrical components. Conversely, an electric motor is a device that converts electrical energy into mechanical energy, typically, rotational in nature. Sources of mechanical energy can include steam turbines, gas turbines, water turbines, internal combustion engines, wind turbines and even hand cranks. Conventional electrical generators exist that can be driven by wind, water, steam, and/or other means.

Conventional electrical generators essentially comprise at least one tightly-wrapped copper wire induction coil (sometimes referred to as a "stator") as well as at least one permanent magnet attached to a rotating fixture (sometimes referred to as a "rotor"). As the rotor rotates, it creates a varying magnetic field that induces a varying electrical potential in the stator's wire induction coil(s). This varying electrical potential can then be directed to an external circuit, thereby allowing the electricity to be used to power equipment or devices.

Conventional electrical generators typically require intricate mechanical gearing and complex construction which can greatly increase the cost of the generator, both in terms of initial investment as well as ongoing maintenance costs. Importantly, such conventional electrical generators must be completely shut down and substantially disassembled in order to remove and/or replace induction coils and/or other components of said generators. As a result, repair and/or maintenance of such conventional generators can be extremely time consuming and expensive, both in terms of labor requirements and operational down-time. In addition, these machines are typically constructed with integral stators and rotors which cannot be easily serviced in the field and/or without specialized tooling.

Thus, there is a need for a low cost, high power electrical generator capable of operating at relatively low speeds. The electrical generator should be of compact and modular construction, while permitting "hot swappable capability"— that is, induction coils and other critical components of the generator should be capable of being removed and/or replaced without interruption of the generator operation.

SUMMARY OF THE INVENTION

In a preferred embodiment, the present invention comprises a modular device that can operate as an electrical generator or electric motor. The device of the present invention is characterized by efficient operation and basic yet rugged construction, as well as ease of assembly, disassembly, maintenance, and repair. The device of the present invention is also versatile, durable and capable of operating at relatively low speeds. Although described herein and referred to primarily as an electrical generator for ease of reference, it is to be understood that the present invention can also be alternatively configured to operate as an electric motor.

In a preferred embodiment, the electrical generator assembly of the present invention generally comprises a pair of spaced-apart, substantially planar coil support plates. Said spaced-apart coil support plates are oriented substantially parallel to each other with a gap or space formed therebetween. Further, each of said coil support plates has a substantially smooth surface on its inner side surface, as well as shaped and spaced-apart recesses on its outer side surface.

A rotor shaft is rotatably received within aligned central bores extending through at least one of said parallel spaced-apart coil support plates. The longitudinal axis of said rotor shaft is oriented substantially perpendicular to both of said parallel spaced-apart coil support plates. Said rotor shaft can be driven by wind, water, steam turbine or other means designed to apply torque forces to said rotor shaft. At least one bearing can be employed to reduce rotational friction during spinning of said rotor shaft and aid in maintaining a proper air gap between the rotor and stators.

A rotor disc member is operationally attached to said rotor shaft; said rotor disc member is disposed within said gap formed between said spaced-apart coil support plates and is oriented substantially parallel to said coil support plates. Said rotor disc is permitted to freely rotate within said gap. In a preferred embodiment, said rotor disc further comprises a plurality of rows of spaced holes disposed in a radial configuration; each of said holes can receive a magnet having appropriate dimensions to be received within said holes. Further, said magnets are placed in a radial configuration with the polarity of said magnets generally alternating (opposite) while facing outward. Said rotor disc can optionally include a plurality of radially oriented grooves disposed between certain of said spaced holes/magnets to provide selectively positioned air gaps.

In a preferred embodiment, a plurality of shaped and spaced-apart recesses is formed on each of the outer surfaces of said parallel coil support plates. A coil assembly is removably mounted within each of said shaped and spaced-apart recesses. Although the shape of said recesses and mating coil assemblies can vary without departing from the scope of the invention, said recesses can beneficially be substantially wedge-shaped. Further, said wedge-shaped recesses can be oriented in a substantially circular arrangement on each of said coil support plates.

In a preferred embodiment, each of said coil assemblies generally comprises a C-shaped core member having a construction similar to a standard transformer laminated iron c-core. ("C-core"). Each of said C-cores further comprises a plurality of laminated sheets of thin metal laid in parallel and formed into a "C" shape, with two substantially parallel legs having a wire coil operationally wound around each leg. Said legs (with wire coils) are operationally mounted within a shaped base member that, in turn, can be received within a mating recessed area disposed on the outer surface of said coil support plates.

Rotation of said rotor shaft causes said rotor disc to rotate within the gap formed between said spaced-apart coil support plates. It is to be observed that the magnets disposed on said rotor disc are generally aligned in corresponding relationship with the wire coils of said C-cores. The electrical generator assembly of the present invention generates power by spacing concentric rows of multiple magnets wherein each magnet has a North (+) pole on one side and South (−) pole on the other side of the rotor disc, while adjacent magnets are disposed on said rotor disc with opposite polarity.

In this manner, a pathway—referred to herein as a "dynamic flux pathway"—forms between the magnets of the rotor disc and said opposing coils of said C-core legs. Due to the magnetic pole reversal as the rotor disc turns, said dynamic flux pathway forms in the opposite direction within the assembly, allowing for naturally produced alternating current electricity.

BRIEF DESCRIPTION OF DRAWINGS/FIGURES

The foregoing summary, as well as any detailed description of the preferred embodiments, is better understood when read in conjunction with the drawings and figures contained herein. For the purpose of illustrating the invention, the drawings and figures show certain preferred embodiments. It is understood, however, that the invention is not limited to the specific methods and devices disclosed in such drawings or figures.

Further, the drawings constitute a part of this specification and include exemplary embodiments of the technology. It is to be understood that in some instances, various aspects of the invention may be shown exaggerated or enlarged to facilitate an understanding of the invention. Therefore, the drawings may not be to scale.

FIG. 4 depicts an overhead view of an electrical generator assembly of the present invention.

FIG. 5 depicts a sectional view along line 5-5 shown in FIG. 4.

DETAILED DESCRIPTION OF A PREFERRED EMBODIMENT OF THE INVENTION

The foregoing summary, as well as any detailed description of the preferred embodiments, is better understood when read in conjunction with the drawings and figures contained herein. For the purpose of illustrating the invention, the drawings and figures show certain preferred embodiments. It is understood, however, that the invention is not limited to the specific methods and devices disclosed in the appended drawings or figures.

The present invention comprises a modular device that can operate as an electrical generator or electric motor. As previously noted, the present invention is described herein primarily as an electrical generator for ease of reference. However, notwithstanding the foregoing, it is to be understood that the present invention can also be alternatively configured to operate as an electric motor.

Figure 1:
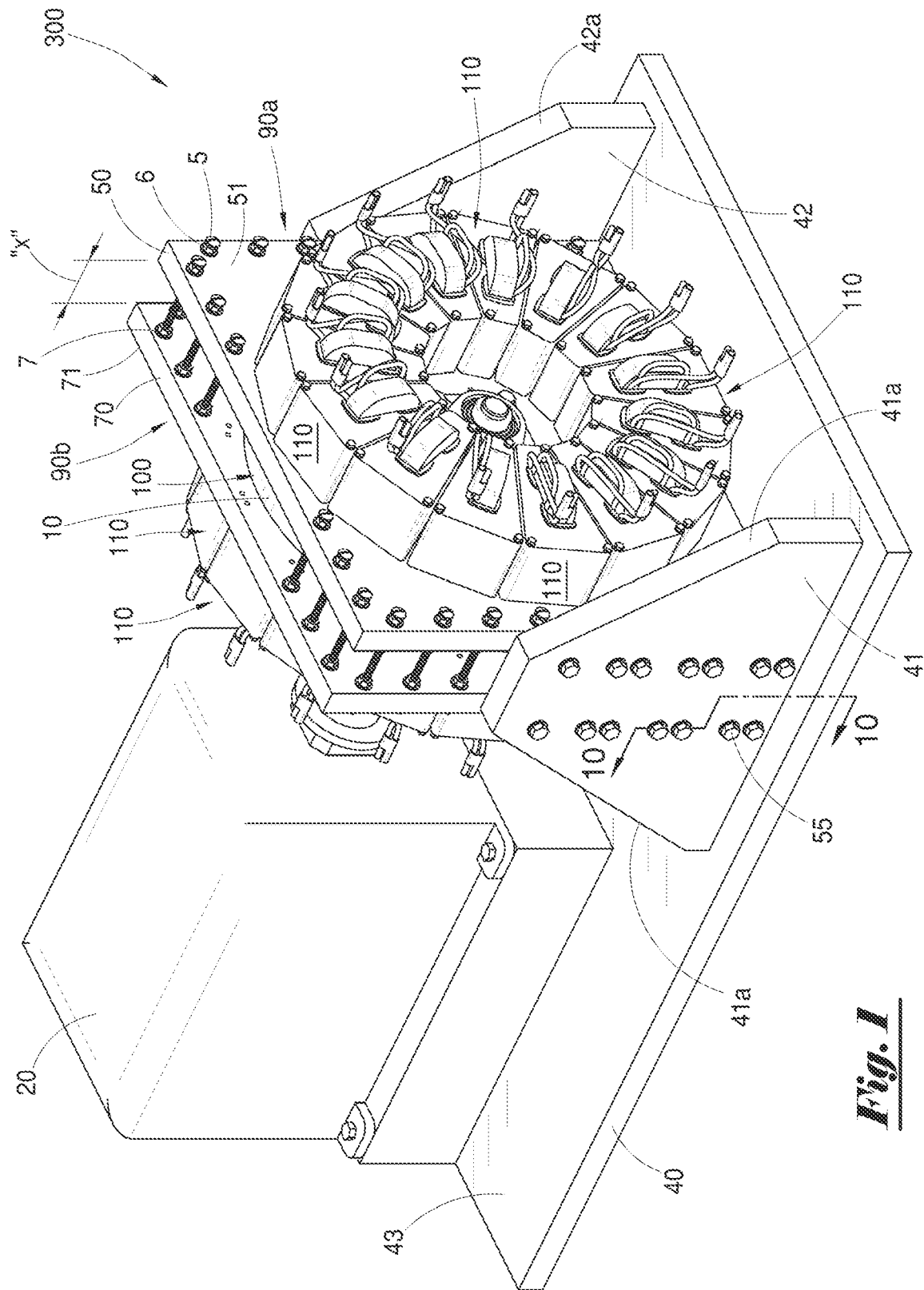
FIG. 1 depicts a first side perspective view of an electrical generator assembly of the present invention.

FIG. 1 depicts a first side perspective view of an electrical generator assembly 300 of the present invention. In a preferred embodiment, said electrical generator assembly 300 of the present invention generally comprises a first stator mounting member 50 and a second stator mounting member 70. As depicted in FIG. 1, said first stator mounting member 50 and said second stator mounting member 70 each comprise a substantially planar plate member. Said first stator mounting member 50 and said second stator mounting member 70 are configured in parallel orientation with a gap or space (denoted as "x" in FIG. 1) formed therebetween. A rotor disc 10 (partially visible in FIG. 1) is disposed between said parallel first stator mounting member 50 and second stator mounting member 70.

Side support member 41 is positioned along one side of said first stator mounting member 50 and said second stator mounting member 70, while side support member 42 is positioned along the opposite side of said first stator mounting member 50 and said second stator mounting member 70. In the embodiment depicted in FIG. 1, said side support members 41 and 42 each comprise a substantially planar mounting member; said side support members 41 and 42 are configured parallel to each other, and perpendicular to said first stator mounting member 50 and said second stator mounting member 70.

Said side support members 41 and 42 secure and stabilize stator mounting member 50 and second stator mounting member 70 on underlying base member 40. Underlying support base member 40 generally comprises a supportive foundation having flat upper surface 43 that permits convenient transportation, storage and placement of electrical generator assembly 300. It is to be understood that said electrical generator assembly 300 can alternatively be mounted on a pallet or other portable base member, or permanently attached to a floor or other supportive structure in any orientation without departing from the scope of the present invention. In the configuration depicted in FIG. 1, a drive motor housing 20 is also mounted to base member 40 in a desired position relative to said first stator mounting member 50 and said second stator mounting member 70.

A plurality of coil assemblies 110 are removably attached to the outer surface 51 of said first stator mounting member 50. Similarly, a plurality of coil assemblies 110 are also removably attached to the outer surface 71 of said second stator mounting member 70. Side support members 41 and 42 have tapered edge surfaces 41a and 42a, respectively, and are beneficially configured so that they do not block or otherwise obstruct convenient access to said coil assemblies 110.

Figure 2:
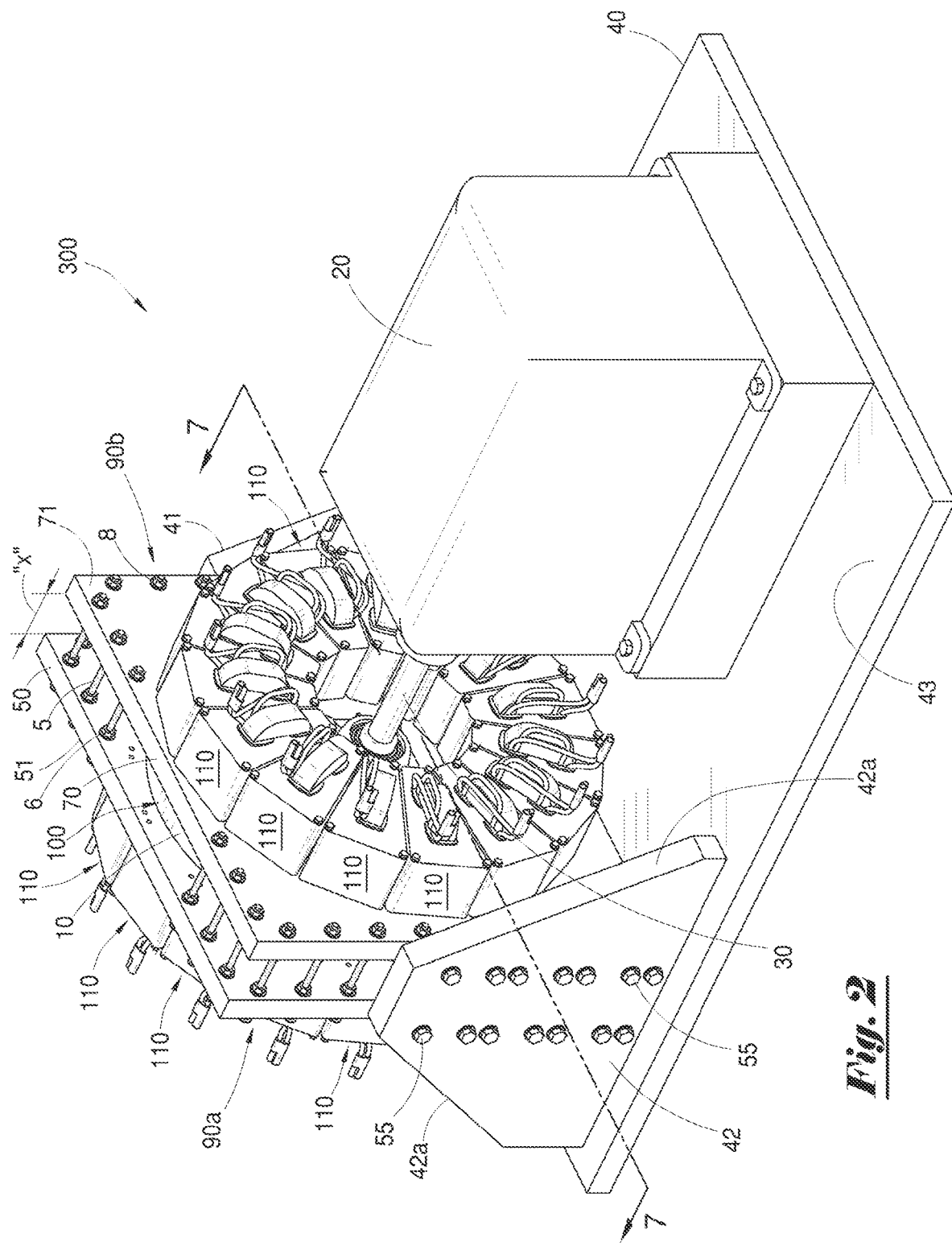
FIG. 2 depicts a second side view of an electrical generator assembly of the present invention.

FIG. 2 depicts a second side view of an electrical generator assembly 300 of the present invention. Said electrical generator assembly 300 of the present invention generally comprises first stator mounting member 50 and a second stator mounting member 70. Said first stator mounting member 50 and said second stator mounting member 70 are parallel to each other and spaced-apart, with a gap or space (denoted as "x") formed therebetween. Side support members 41 and 42 are positioned along the sides of said first stator mounting member 50 and said second stator mounting member 70. Said side support members 41 and 42 are utilized to securely attach first stator mounting member 50 and second stator mounting member 70 to underlying support base member 40.

A plurality of coil assemblies 110 are removably attached to the outer surface 51 of said first stator mounting member 50. Similarly, a plurality of coil assemblies 110 are removably attached to the outer surface 71 of said second stator mounting member 70. Drive motor housing 20 is mounted on base member 40. Drive shaft 30 extends from drive motor housing 20 to rotor disc 10 (partially visible in FIG. 2) which is rotatably disposed in the space formed between parallel first stator mounting member 50 and second stator mounting member 70.

Figure 3:
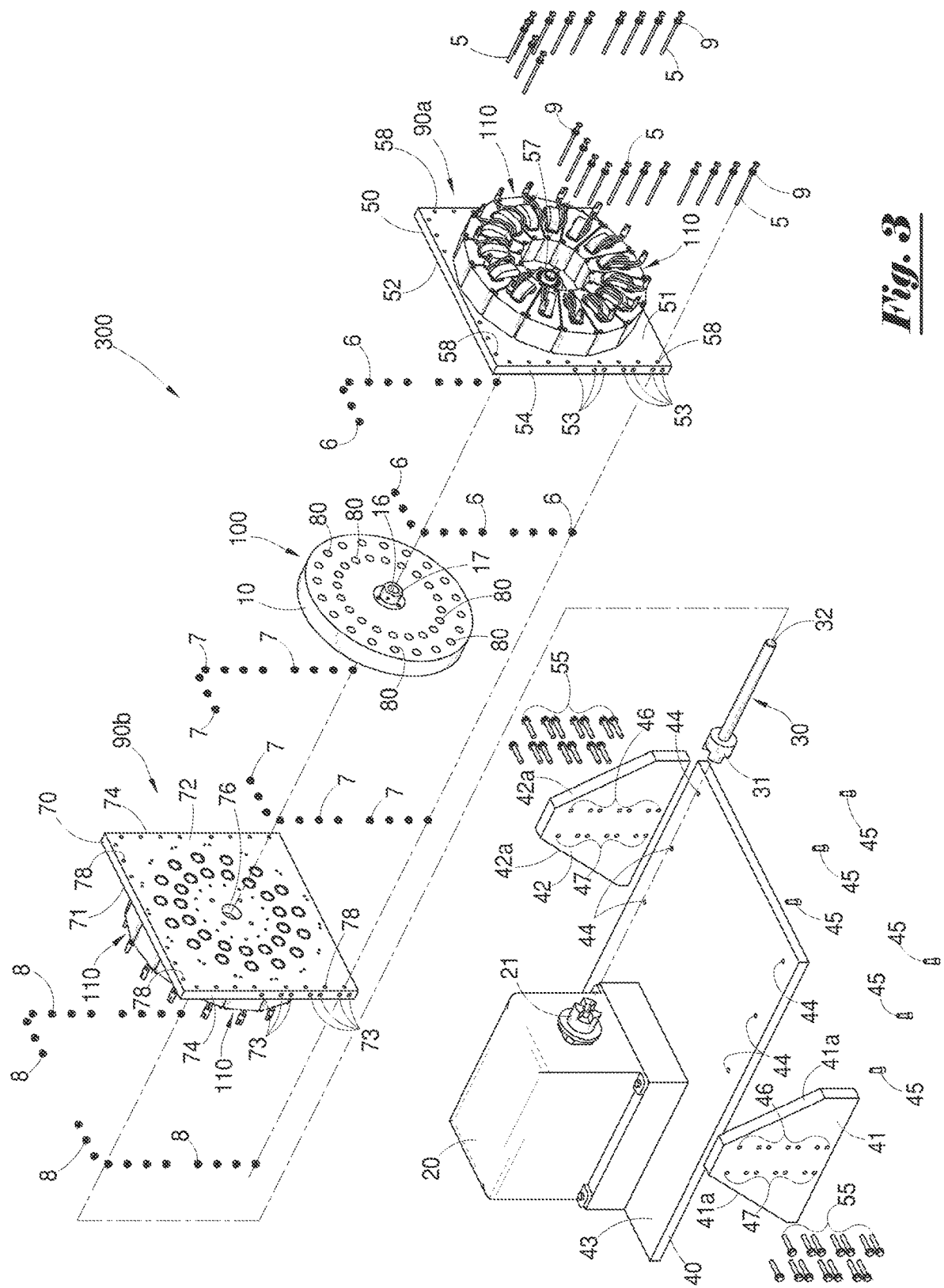
FIG. 3 depicts a side perspective and exploded view of the electrical generator assembly of the present invention.

FIG. 3 depicts a side perspective and exploded view of the electrical generator assembly 300 of the present invention. Underlying support base member 40 generally comprises a supportive foundation that permits convenient transportation, storage and placement of electrical generator assembly 300. In the embodiment depicted herein, said underlying support base member 40 comprises a substantially planar member having a substantially flat upper surface 43. A plurality of bores 44 extend through said base member 40 and are generally aligned with side support members 41 and 42. As previously noted above, although the embodiment depicted herein includes support base member 40, electrical generator assembly 300 can alternatively be mounted on a pallet or other portable supportive base member, or permanently attached to a floor or other support structure.

Side support members 41 and 42 are oriented parallel to each other and are disposed on the upper surface 43 of base member 40. In a preferred embodiment, side support member 41 has tapered edge surfaces 41a, while side support member 42 has tapered edge surfaces 42a. Mechanical fasteners 45 (which can be threaded bolts, for example) are installed through bores 44 and securely attach side support members 41 and 42 to base member 40.

First stator mounting member 50 comprises a substantially planar plate member having an outer surface 51, an inner surface 52 and edge surfaces 54. A plurality of bores 53 extend into edge surfaces 54 and are oriented substantially parallel to planar first stator mounting member 50. Said bores 53 are aligned with transverse bores 46 extending through side support members 41 and 42. Mechanical fasteners 55 (which can be threaded bolts, for example) are installed through bores 46 and aligned bores 53, and securely attach side support members 41 and 42 to first stator mounting member 50. A plurality of coil assemblies 110 are removably attached to outer surface 51 of said first stator mounting member 50.

Second stator mounting member 70 also comprises a substantially planar plate member having an outer surface 71, an inner surface 72 and edge surfaces 74. A plurality of bores 73 extend into edge surfaces 74 and are oriented substantially parallel to planar second stator mounting member 70. Said bores 73 are aligned with transverse bores 47 extending through side support members 41 and 42. Mechanical fasteners 55 are installed through bores 47 and aligned bores 73, and securely attach side support members 41 and 42 to second stator mounting member 70. A plurality of coil assemblies 110 are removably attached to the outer surface 71 of said second stator mounting member 70.

It is to be observed that said first stator mounting member 50 and said second stator mounting member 70 are disposed in spaced-apart and parallel orientation along upper surface 43 of base member 40. Further, side support members 41 and 42 are disposed parallel to each other, and generally perpendicular to said first stator mounting member 50 and said second stator mounting member 70.

Drive motor housing 20 is mounted on upper surface 43 of base member 40. A drive motor having output drive head 21 is disposed in said drive motor housing 20; operation of said drive motor causes powered rotation of said output drive head 21. Drive shaft 30 has head member 31 that is configured to mate with output drive head 21, such that rotation of output drive head 21 causes rotation of drive shaft 30. Drive shaft 30 extends from output drive head 21 through central bore 76 of second stator mounting member 70, central bore 16 of rotor disc 10 (which can include shaft lock fitting 17 used to secure rotor disc 10 to drive shaft 30), and an aligned central bore of first stator mounting member 50 (not visible in FIG. 3). Distal end 32 of drive shaft 30 can be rotatably received in bearing mount 57 attached to said first stator mounting member 50.

A plurality of bores 58 extend through first stator mounting member 50 and are generally disposed near the periphery of said first stator mounting member 50. A plurality of aligned bores 78 also extend through second stator mounting member 70 and are similarly generally disposed near the periphery of said second stator mounting member 70. Elongated bolts 5 having spacer nuts 9 installed are disposed through aligned bores 58 and 78; end nuts 8 are threadedly installed on said bolts 5. In a preferred embodiment, spacer nuts 6 and 7 are also installed on said elongated bolts 5 in the gap formed between mounting member 50 and second stator mounting member 70. It is to be observed that said elongated bolts 5, spacer nuts 6, 7 and 9, and end nuts 8, cooperate to further stabilize and secure first stator mounting member 50 and second stator mounting member 70 against movement, while also ensuring that said gap or space formed between said members remains constant.

Rotor disc 10 is disposed in the space or gap formed between said parallel first stator mounting member 50 and second stator mounting member 70. In a preferred embodiment, said rotor disc 10 is substantially circular in shape, and is securely mounted to drive shaft 30. Said rotor disc further comprises a plurality of rows of spaced holes disposed in a radial configuration in said disc 10; magnets 80 are received within said holes in rotor disc 10.

FIG. 4 depicts an overhead view of an electrical generator assembly 300 of the present invention. Underlying support base member 40 generally comprises a supportive foundation that permits convenient transportation, storage and placement of electrical generator assembly 300. Side support members 41 and 42 are oriented parallel to each other and are disposed on base member 40. Side support member 41 has upper tapered edge surfaces 41a, while side support member 42 has upper tapered edge surfaces 42a.

First stator mounting member 50 comprises a substantially planar plate member having an outer surface 51 and inner surface 52. Mechanical fasteners 55 (which can be threaded bolts, for example) securely attach side support members 41 and 42 to first stator mounting member 50. A plurality of coil assemblies 110 are removably attached to outer surface 51 of said first stator mounting member 50. Second stator mounting member 70 comprises a substantially planar plate member having an outer surface 71 and inner surface 72. Mechanical fasteners 55 securely attach side support members 41 and 42 to second stator mounting member 70. A plurality of coil assemblies 110 are removably attached to outer surface 71 of said first stator mounting member 70.

First stator mounting member 50 and second stator mounting member 70 are configured in parallel orientation with a gap or space (denoted as "x") formed therebetween. Rotor disc 10 is disposed between said parallel first stator mounting member 50 and second stator mounting member 70. Drive motor housing 20 is mounted on base member 40. Drive shaft 30 has head member 31 that engages with mating motor with output drive head 21. Rotor disc 10 is mounted on drive shaft 30, wherein rotation of drive shaft 30 causes rotation of said rotor disc 10.

A plurality of bores 58 extend through first stator mounting member 50 and are generally disposed near the periphery of said first stator mounting member 50. A plurality of aligned bores 78 also extend through second stator mounting member 70 and are similarly generally disposed near the periphery of said second stator mounting member 70. Elongated bolts 5 having spacer nuts 9 installed are disposed through aligned bores 58 and 78; end nuts 8 are threadedly installed on said bolts 5. In a preferred embodiment, spacer nuts 6 and 7 are also installed on said elongated bolts 5 in the gap formed between first stator mounting member 50 and second stator mounting member 70. It is to be observed that said elongated bolts 5, spacer nuts 6, 7 and 9, and end nuts 8, cooperate to further stabilize and secure first stator mounting member 50 and second stator mounting member 70 against movement, while also ensuring that said gap or space formed between said members remains constant.

Rotor disc 10 is disposed in the space or gap formed between said parallel first stator mounting member 50 and second stator mounting member 70. In a preferred embodiment, said rotor disc 10 is substantially circular in shape, and is securely mounted to drive shaft 30.

FIG. 5 depicts a sectional view along line 5-5 shown in FIG. 4. Elongated bolts 5 are disposed through aligned bores extending through parallel first stator mounting member 50 and second stator mounting member 70. End nuts 8 are threadedly installed on said bolts 5 and are disposed against outer surface 71 of second stator mounting member 70. Spacer nuts 9 are threadedly disposed on bolts 5 and are disposed against outer surface 51 of first stator mounting member 50. Spacer nuts 6 are threadedly disposed on bolts 5 and are disposed against inner surface 52 of first stator mounting member 50, while spacer nuts 7 are threadedly disposed on bolts 5 and are disposed against inner surface 72 of second stator mounting member 70. Elongated bolts 5, spacer nuts 6, 7 and 9, and end nuts 8, cooperate to stabilize and secure said first stator mounting member 50 and said second stator mounting member 70 in position, while also preventing unwanted movement of said first and second stator mounting members 50 and 70.

Figure 6:
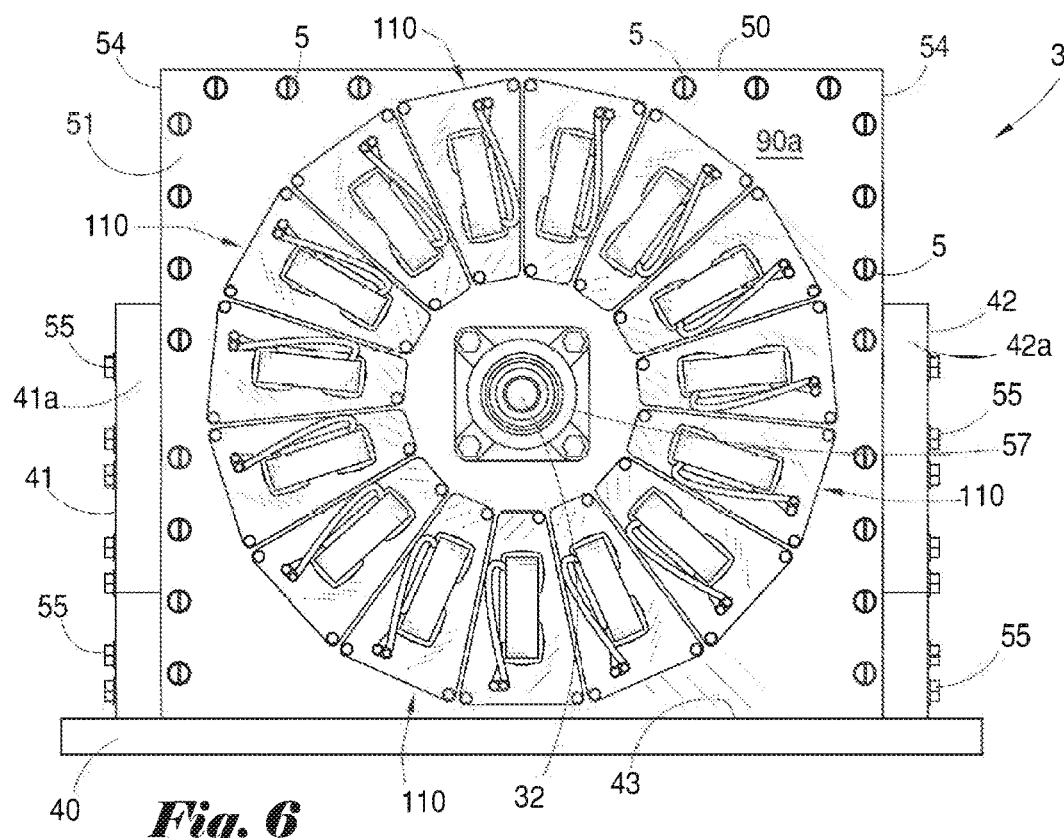
FIG. 6 depicts an end view of an electrical generator assembly of the present invention.
Figure 7:
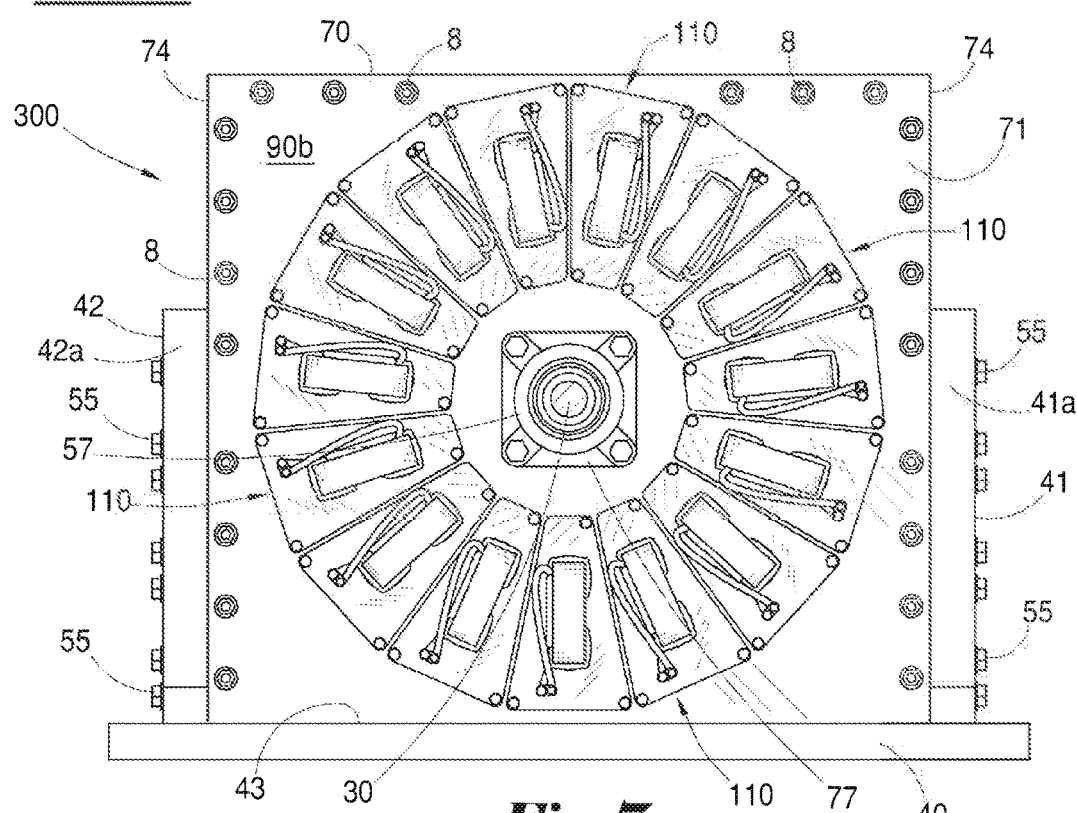
FIG. 7 depicts a section view along line 7-7 shown in FIG. 2.

FIG. 6 depicts an end view of an electrical generator assembly 300 of the present invention, while FIG. 7 depicts a section view along line 7-7 shown in FIG. 2. Referring to FIG. 6, first stator mounting member 50 is disposed on upper surface 43 of base member 40. Said first stator mounting member 50 comprises a substantially planar plate member having an outer surface 51 and edge surfaces 54, while elongated bolts 5 are installed generally around the periphery of said first stator mounting member 50. Mechanical fasteners 55 securely attach side support members 41 and 42 to first stator mounting member 50. A plurality of coil assemblies 110 are removably attached to outer surface 51 of said first stator mounting member 50. Bearing mount 57 is also disposed on outer surface 51 of said first stator mounting member 50, and distal end 32 of drive shaft 30 is rotatably received in said bearing mount 57.

Referring to FIG. 7, second stator mounting member 70 is disposed on upper surface 43 of base member 40. Said second stator mounting member 70 comprises a substantially planar plate member having an outer surface 71 and edge surfaces 74, while end nuts 8 are installed on elongated bolts generally around the periphery of said second stator mounting member 70. Mechanical fasteners 55 securely attach side support members 41 and 42 to second stator mounting member 70. A plurality of coil assemblies 110 oriented directly opposing coil assemblies shown on FIG. 6, are removably attached to outer surface 71 of said second stator mounting member 70. Bearing mount 77 is also disposed on outer surface 71 of said second stator mounting member 70, and drive shaft 30 is rotatably received within said bearing mount 77.

Figure 8:
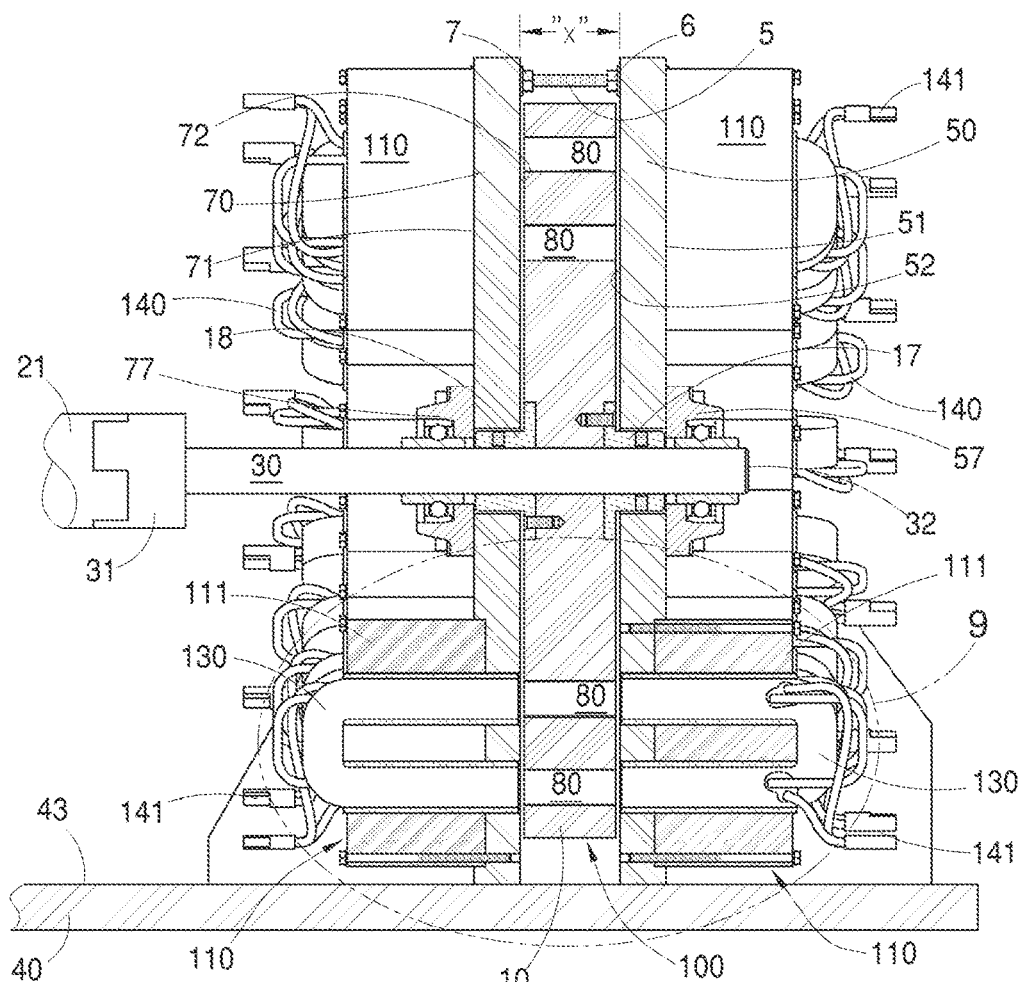
FIG. 8 depicts a sectional view along line 8-8 shown in FIG. 4.

FIG. 8 depicts a sectional view along line 8-8 shown in FIG. 4. Underlying support base member 40 generally comprises a supportive foundation having flat upper surface for electrical generator assembly 300. First stator mounting member 50 comprises a substantially planar plate member having an outer surface 51 and inner surface 52. Second stator mounting member 70 comprises a substantially planar plate member having an outer surface 71 and inner surface 72.

First stator mounting member 50 and second stator mounting member 70 are configured in parallel orientation with a gap or space (denoted as "x") formed therebetween. Elongated bolts 5 having spacer nuts 6 and 7 further stabilize and secure first stator mounting member 50 and second stator mounting member 70 to each other and against movement, while also ensuring that said gap or space formed between said members 50 and 70 remains constant.

Rotor disc 10 is disposed between said parallel first stator mounting member 50 and second stator mounting member 70. Said rotor disc further comprises a plurality of rows of spaced holes disposed in a radial configuration in said disc 10; magnets 80 are received within said holes in rotor disc 10. Drive shaft 30 has head member 31 that engages with mating motor output drive head 21. Bearing mount 57 is attached to outer surface 51 of said first stator mounting member 50, while bearing mount 77 is disposed on outer surface 71 of said second stator mounting member 70. Drive shaft 30 is rotatably disposed through aligned bearing mounts 57 and 77 and secured to rotor disc 10 using shaft lock fittings 17 and 18. A plurality of coil assemblies 110 are removably attached to said outer surfaces 51 and 71.

Figure 9:
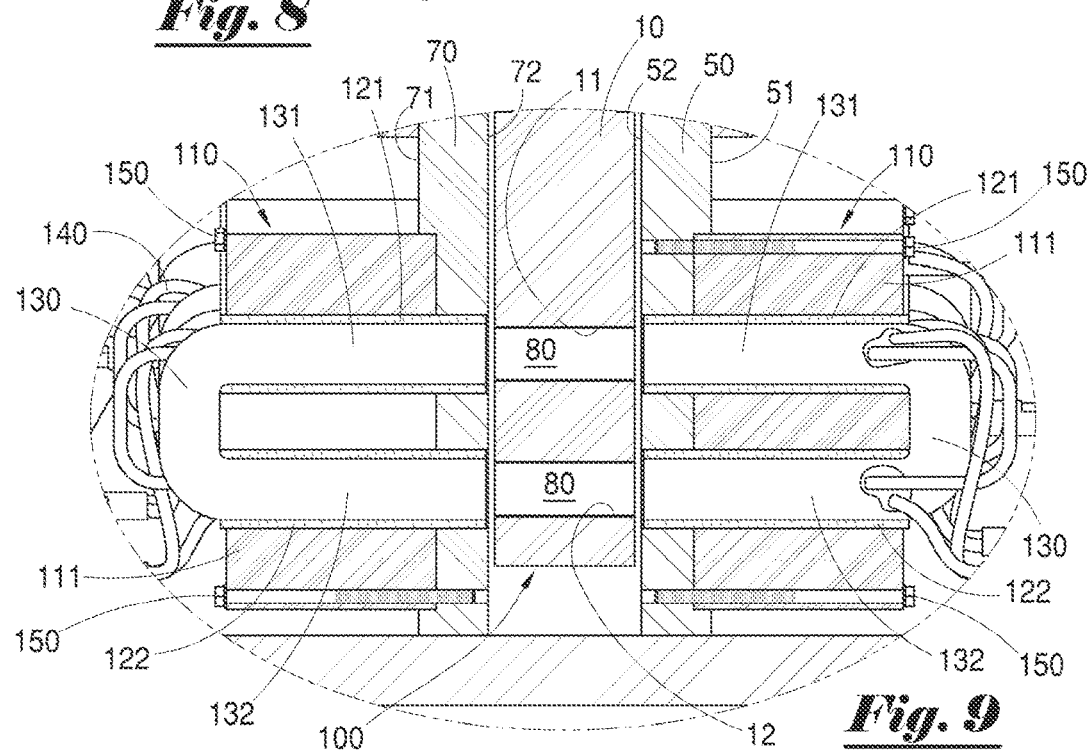
FIG. 9 depicts a detailed view of a highlighted area shown in FIG. 8.

FIG. 9 depicts a detailed view of a highlighted area shown in FIG. 8. Referring to FIG. 9, each of said coil assemblies 110 comprises C-core 130 mounted within a wedge-shaped body member 111. In a preferred embodiment, said C-core 130 is has substantially parallel legs 131 and 132 constructed in a manner typical of transformer iron c-cores. In a preferred embodiment, tightly-wrapped copper coil 121 is disposed on leg 131, while tightly-wrapped copper coil 122 is disposed on substantially parallel leg 132. Wires 140 having electrical connector 141 are attached to C-core 130 and electrically connected to said copper coils 121 and 122. Note that the number of winds of coils 121 and 122 affects the electrical potential output for the machine. Rotor disc comprises a plurality of rows of spaced holes 11 and 12 disposed in a radial configuration in said disc 10. Magnets 80 are received within said holes 11 and 12 in rotor disc 10.

Figure 10:
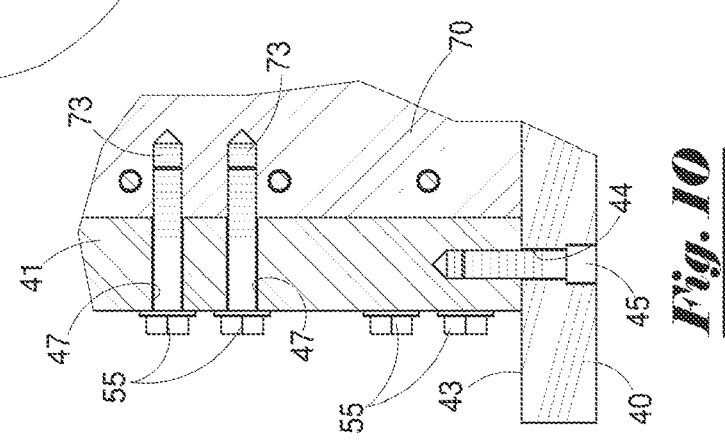
FIG. 10 depicts a section view along line 10-10 shown in FIG. 1.

FIG. 10 depicts a section view along line 10-10 shown in FIG. 1. Side support member 41 is disposed on the upper surface 43 of base member 40. Mechanical fastener 45 extends through bore 44 in base member 40 and securely attaches side support member 41 to said base member 40. Mechanical fasteners 55 are received in bores 47 extending through side support member 41 and attach said side support member 41 to second stator mounting member 70.

Figure 11:
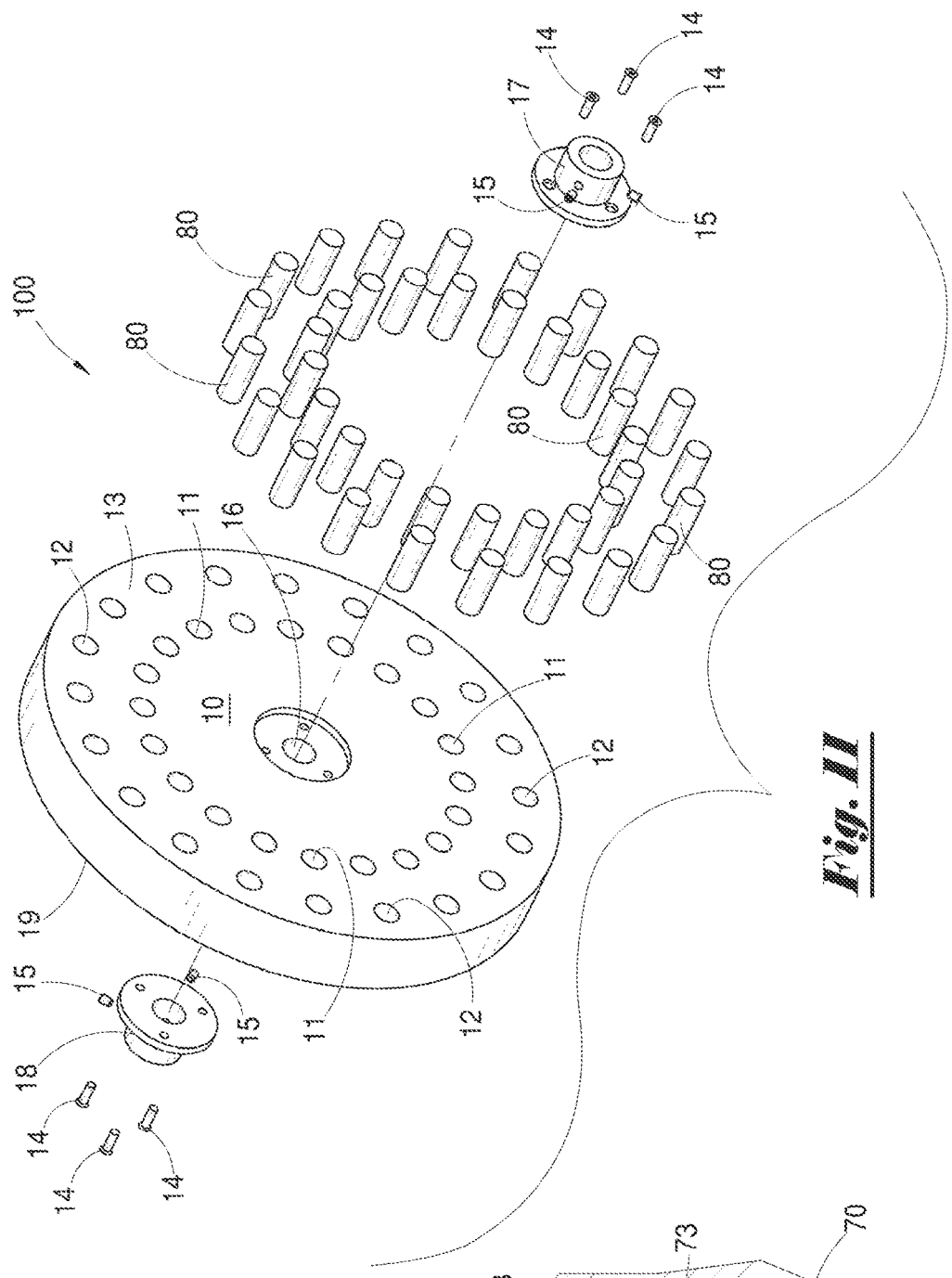
FIG. 11 depicts a side perspective and exploded view of a rotor disc of the present invention.

FIG. 11 depicts a side perspective and exploded view of a rotor disc 10 of the present invention. Rotor disc 10 is substantially circular in shape and has front side 13, rear side 19, and central bore 16 extending through said disc 10. Shaft lock fittings 17 and 18 are attached to said rotor disc 10 with fasteners 14. It is to be observed that drive shaft 30 (not shown in FIG. 11) can be received within said aligned shaft lock fittings 17 and 18 which, in turn, can be secured to said drive shaft using set screws 15. Said rotor disc 10 further comprises a plurality of rows of spaced holes 11 and 12 disposed in a radial configuration in said disc 10. Magnets 80 are received within said holes in rotor disc 10. Holes on the outer radius 12 can be radially in line with the corresponding inner holes 11, or lead, or lag to induce differing waveforms on the machine output.

Figure 12:
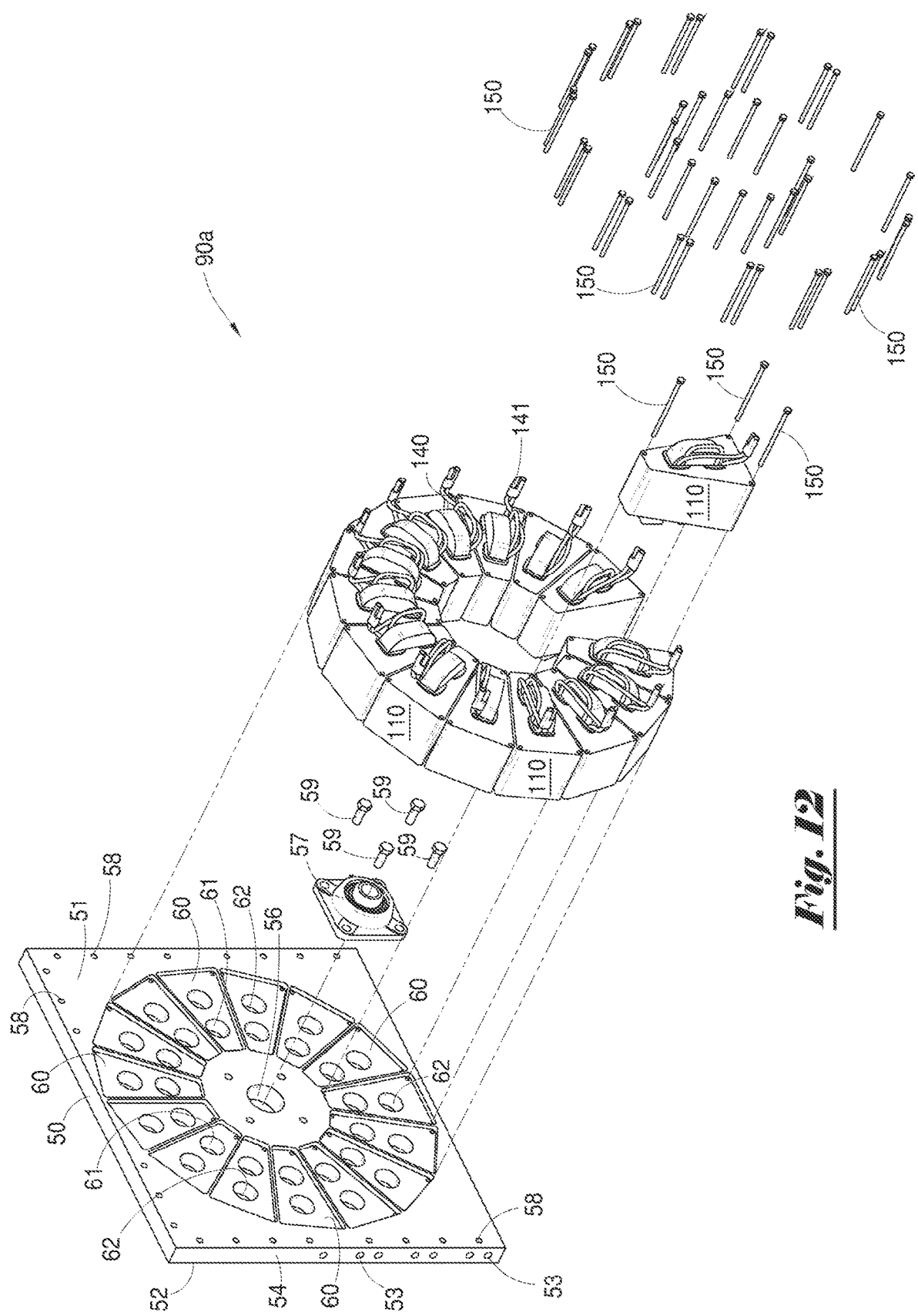
FIG. 12 depicts a front perspective view and exploded view of a portion of the present invention.

FIG. 12 depicts a front perspective and exploded view of a portion of electrical generator assembly of the present invention. First stator mounting member 50 comprises a substantially planar plate member having an outer surface 51, an inner surface 52, edge surfaces 54 and central bore 56. Bearing mount 57 is attached to outer surface 51 of said first stator mounting member 50 using fasteners 59 and is aligned with said central bore 56.

In a preferred embodiment, a plurality of shaped and spaced-apart recesses 60 is disposed on the outer surface 51 of first stator mounting member 50. Although the shape of said recesses 60 can vary without departing from the scope of the invention, as depicted in FIG. 12 each of said recesses 60 are beneficially substantially wedge-shaped. Further, said wedge-shaped recesses 60 can be oriented in a substantially circular arrangement on outer surface 51 of first stator mounting member 50. Radially spaced holes 61 and 62 disposed in said first stator mounting member 50 within each of said recesses 60. A coil assembly 110 is removably mounted within each of said recesses 60 in the outer surface 51 of said first stator mounting member 50 using fasteners 150.

Figure 13:
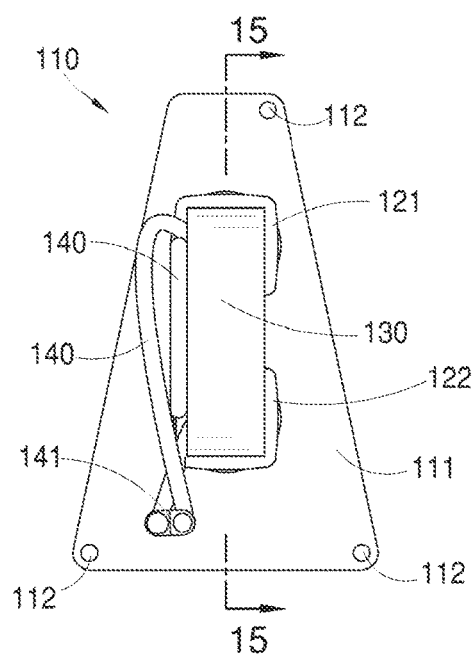
FIG. 13 depicts a front view of a removable coil assembly member of the present invention.

FIG. 13 depicts a front view of a removable coil assembly 110 of the present invention. In a preferred embodiment, said removable coil assembly 110 generally comprises body member 111. It is to be observed that said body member 111 is generally configured (including, without limitation, having a substantially wedge shape) to fit within a recess 60 formed on outer surface 51 of first stator mounting member 50. A plurality of bores 112 extend through said body member 111 and can receive mechanical fasteners (such as fasteners 150 shown depicted in FIG. 12) that can be used to removably anchor said body member 111 to said outer surface 51 of first stator mounting member 50. C-core 130 is mounted within body member 111. Wires 140 having electrical connector 141 are attached to C-core 130.

Figure 14:
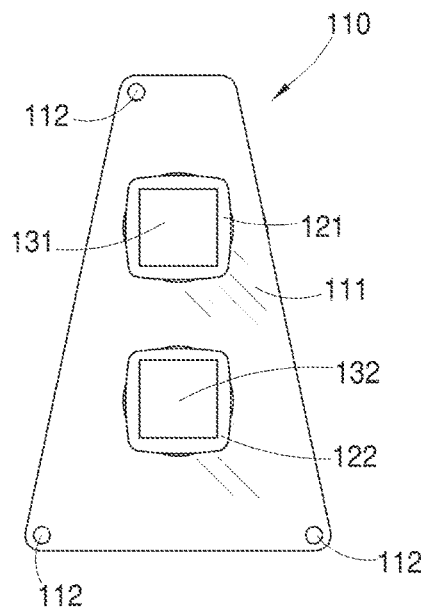
FIG. 14 depicts a rear view of a removable coil assembly member of the present invention.

FIG. 14 depicts a rear view of a removable coil assembly 110 of the present invention, rotated approximately 180-degrees from the view depicted in FIG. 13 around a vertical axis. Body member 111 is substantially wedge shaped to fit within a recess 60 formed on outer surface 51 of first stator mounting member 50. A plurality of bores 112 extend through said body member 111 to permit removably attachment of said body member 111 to said outer surface 51 of first stator mounting member 50. C-core 130 is mounted within body member 111. In a preferred embodiment, said C-core is formed utilizing similar methods as manufacturing transformer c-cores, having a substantially square cross section and defines substantially parallel first leg 131 and second leg 132. In a preferred embodiment, said C-core 130 is of a construction typical to transformer c-cores wherein the materials, construction, dimensions and configuration can be selected to optimize the output of the machine for a desired output.

Various standard transformer c-core manufacturing techniques, materials, and configurations can be employed to optimize various preferred outputs from the machine. For example, a variety of materials including, but not limited to MPP, Powdered iron, Silectron, and Supermalloy have varying magnetic permeability or magnetic sensitivity. Furthermore, the specific dimensions of the c-core cross section, leg length, and overall length affect the hysteresis loop (or BH Loop) exhibited by the c-core. Further still, commonly construction methods utilizing thin laminated metal sheets on the order of 2 mil (or can vary) concentrate the magnetic flux around the c-core and minimize eddy currents at the edges. These design choices affect the overall performance of the machine and allow the machining designer to choose materials, dimensions, and configurations to optimize the desired performance and or cost of the machine for a specific application.

Figure 15:
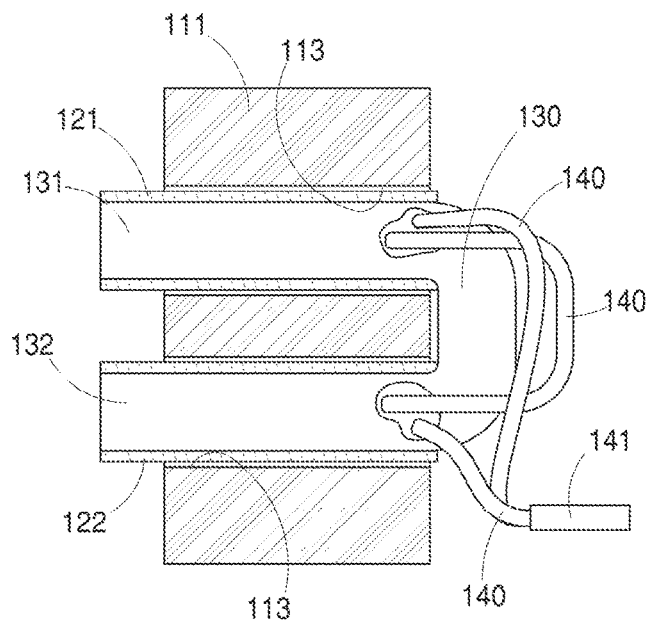
FIG. 15 depicts a side sectional view of a removable coil assembly member along line 15-15 shown in FIG. 13.

FIG. 15 depicts a side sectional view of a removable coil assembly 110 along line 15-15 shown in FIG. 13. C-core 130 is mounted within body member 111. In a preferred embodiment, said C-core 130 has substantially parallel legs 131 and 132. In a preferred embodiment, tightly-wrapped copper coil 121 is disposed on leg 131, while tightly-wrapped copper coil 122 is disposed on substantially parallel leg 132. Coils 121 and 122 can further comprise copper/silver alloy for increased induction in coil assemblies. Wires 140 having electrical connector 141 are attached to C-core 130 and electrically connected to said copper coils 121 and 122.

Figure 16:
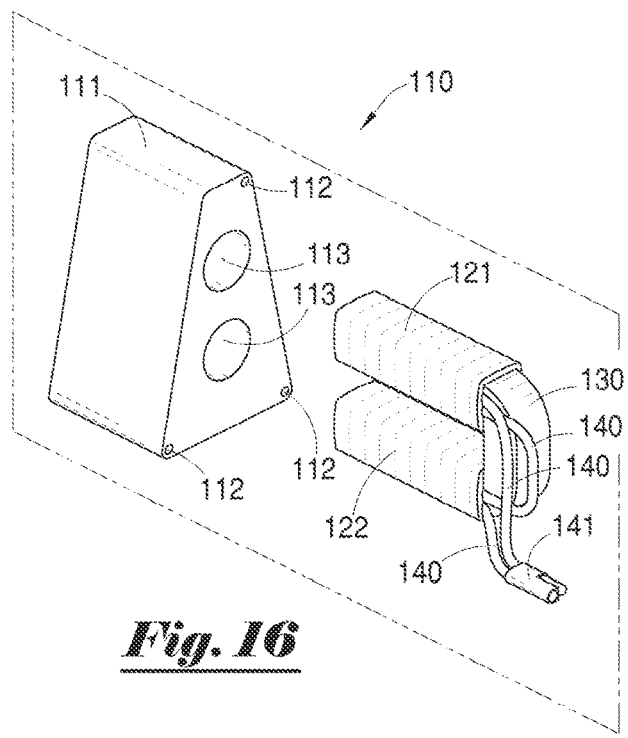
FIG. 16 depicts an exploded perspective view of a removable coil assembly member of the present invention.

FIG. 16 depicts an exploded perspective view of a removable coil assembly 110 of the present invention. Body member 111 is substantially wedge shaped to fit within a recess 60 formed on outer surface 51 of first stator mounting member 50. A plurality of bores 112 extend through said body member 111 to receive fasteners and permit removably attachment of said body member 111 to said outer surface 51 of first stator mounting member 50. Additionally, transverse bores 113 also extend through said body member 111 and are spaced and sized to receive substantially parallel 131 and 132 of C-core 130. Tightly-wrapped copper coil 121 is disposed on leg 131, while tightly-wrapped copper coil 122 is disposed on substantially parallel leg 132. Wires 140 having electrical connector 141 are attached to C-core 130 and electrically connected to said copper coils 121 and 122.

Figure 17:
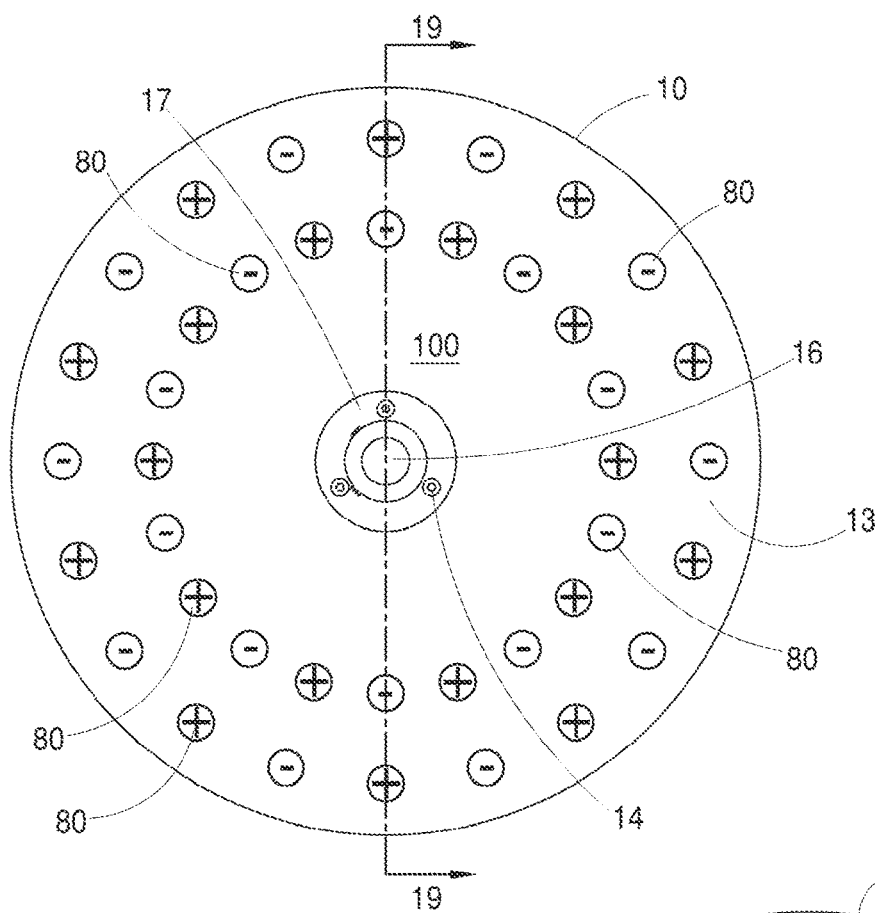
FIG. 17 depicts a front view of a rotor disc of the present invention.
Figure 18:
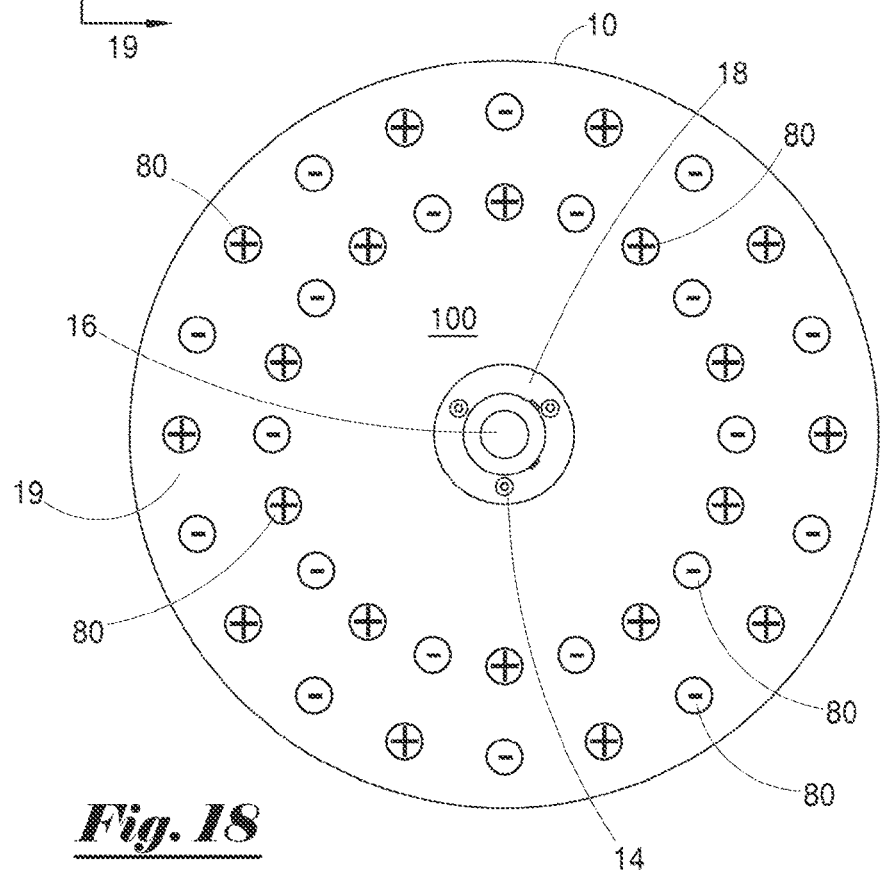
FIG. 18 depicts a rear view of a rotor disc of the present invention.

FIG. 17 depicts a front view of a rotor disc 10 of the present invention having front side 13, while FIG. 18 depicts a rear view of a rotor disc 10 having rear side 19. Rotor disc 10 is substantially circular in shape and has central bore 16 extending through said disc 10. Shaft lock fitting 17 is attached to said rotor disc 10 on front side 13 with fasteners 14 in alignment with said central bore 16. Shaft lock fitting 18 is attached to said rotor disc 10 on rear side 19 with fasteners 14 in alignment with said central bore 16. It is to be observed that a drive shaft (such as drive shaft 30 depicted in FIG. 3) can be received within said aligned shaft lock fittings 17 and 18 which, in turn, can be secured to said drive shaft using set screws 15.

Said rotor disc 10 further comprises a plurality of rows of spaced holes (11 and 12 depicted in FIG. 11) disposed in a radial configuration in said disc 10. Magnets 80 are received within said holes in rotor disc 10. Each magnet 80 has a North (+) pole on one side and South (−) pole on the other side of the rotor disc 10. It is to be observed that magnets 80 are arranged so that polarity of said magnets 80 alternate around the circular patterns formed by spaced holes 11 and 12. Said magnets 80 can comprise 52 mgo magnets. Further, said rotor disc 10 can further optionally include a plurality of radially oriented grooves disposed between certain of said spaced holes/magnets to provide selectively positioned air gaps. Although cylindrical magnets are used in this embodiment for ease of construction, a variety of magnet shapes, sizes, strengths and placement can be tuned by the machine designer to induce a desired output from the machine.

Figure 19:
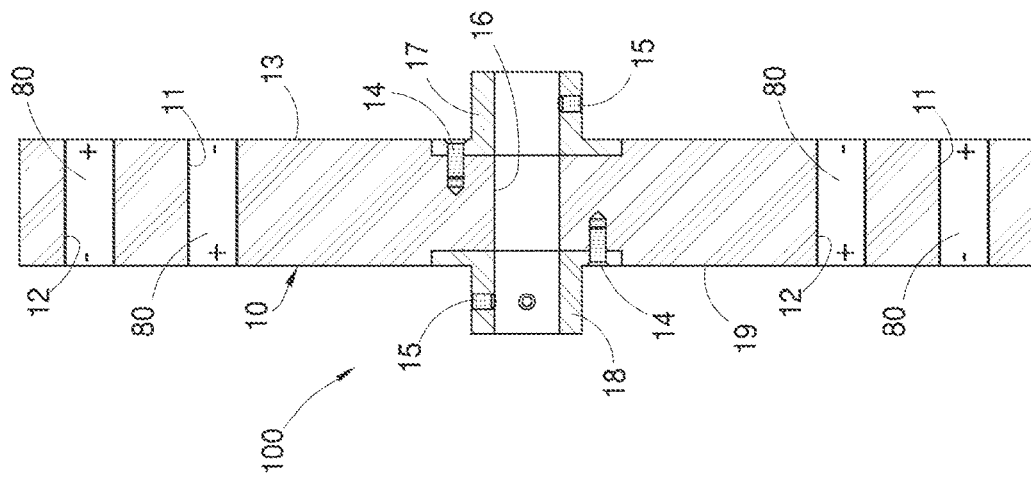
FIG. 19 depicts a side sectional view of a rotor disc of the present invention along line 19-19 shown in FIG. 17.

FIG. 19 depicts a side sectional view of a rotor disc 10 of the present invention along line 19-19 shown in FIG. 17. Planar rotor disc 10 has front side 13, rear side 19 and central bore 16 extending through said disc 10 from said front side 13 to said rear side 19. Shaft lock fitting 17 is attached to said rotor disc 10 on front side 13 with fasteners 14 in alignment with said central bore 16, while shaft lock fitting 18 is attached to said rotor disc 10 on rear side 19 with fasteners 14 in alignment with said central bore 16. Set screws 15 permit locking of said shaft lock fittings 17 and 18—and rotor disc 10—to a drive shaft disposed there through. Said rotor disc 10 further comprises a plurality of rows of spaced holes 11 and 12. Magnets 80 are received within said holes 11 and 12.

Initially, referring to FIGS. 8 and 9, it is to be observed that magnets 80 disposed in rotor disc 10 are generally aligned in corresponding relationship with wire coils 121 and 122 of C-cores 130. Further, as depicted in FIGS. 17 and 18, the electrical generator assembly of the present invention creates a magnetic flux by spacing concentric rows of multiple magnets 80 wherein each magnet has a North (+) pole on one side, and South (−) pole on the other side of the rotor disc 10, while adjacent magnets 80 are disposed in said rotor disc with opposite polarity. When this occurs a pathway—referred to herein as a "dynamic flux pathway"—forms between the magnets 80 of the rotor disc 10 and said opposing coil 121 on C-core leg 131 and coil 122 on C-core leg 132. Due to the magnetic pole reversal as said rotor disc turns, said dynamic flux pathway forms in the opposite direction within the assembly, allowing for a naturally produced a/c signal. The interaction of the alternating magnetic flux in the c-core induces a current in the corresponding coiled wires surrounding the c-cores which can be wired to power external loads.

Figure 20:
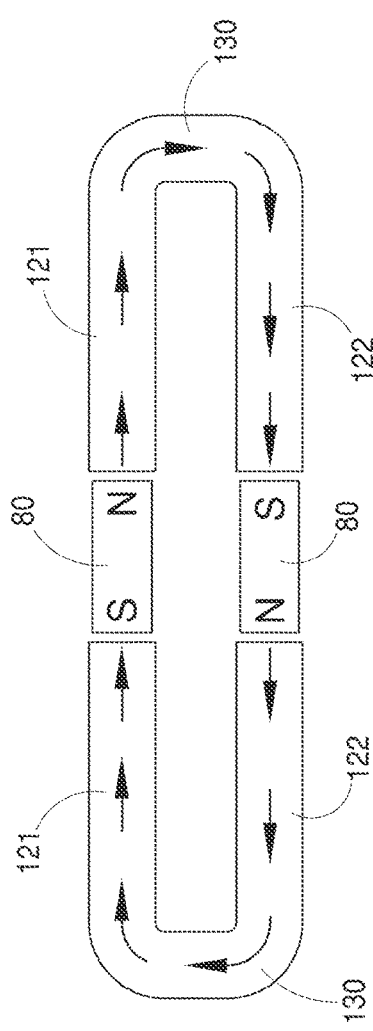
FIG. 20 depicts a schematic view of a first magnetic flux process of an electrical generator assembly of the present invention.
Figure 21:
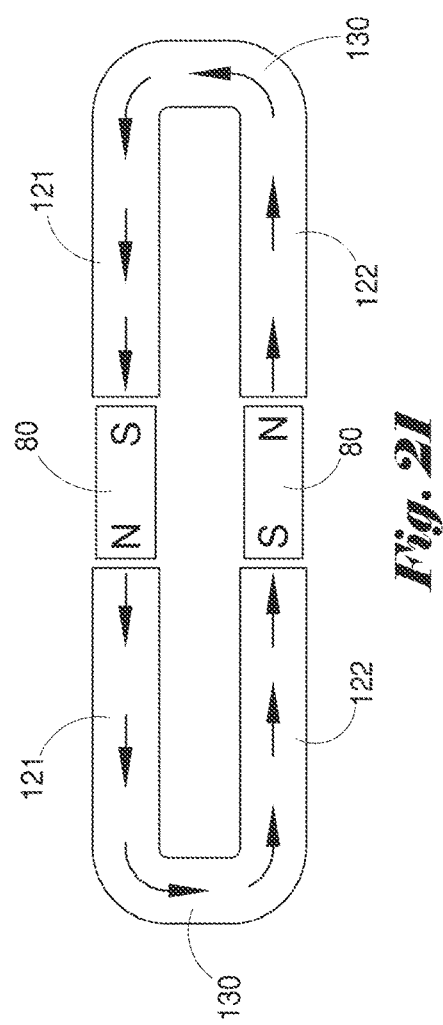
FIG. 21 depicts a schematic view of a second magnetic flux process of an electrical generator assembly of the present invention.

FIG. 20 depicts a schematic view of the magnetic flux wherein the magnets 80 are aligned as shown with the c-cores 130, while FIG. 21 depicts a schematic view of the magnetic flux after further rotation wherein the magnets 80 are aligned as shown with the c-cores (which at this point present the opposing polarity). Generally, in accordance with said dynamic flux pathway, the clockwise flow of magnetic flux shown in FIG. 20 includes an electrical current to flow through coil assemblies 121 and 122 of both opposing C-cores 130 (magnetic induction assembly) simultaneously. Similarly, the counterclockwise flow of magnetic flux shown in FIG. 21 includes an electrical current to flow through coil assemblies 121 and 122 of both opposing C-cores 130 simultaneously and in the opposite direction.

Power (electricity) flows from the coil assemblies via exit wires connected to a wiring harness. In a preferred embodiment, each wiring harness comprises four single wires, the fourth wire being neutral. Each wire is then connected to a third of the coil assemblies on each coil support plate, thus making it a three-phase wiring harness in "WYE" configuration. This three-phase harness allows for electrical flow from the coil assemblies to a collection point. In the illustrated embodiment, the "WYE" configuration is preferable in certain applications; however, other configurations including "DELTA" configurations, or configurations wherein each C-core pair are independently providing power to various external isolated loads, can be employed without departing from the scope of the present invention.

Figure 22:
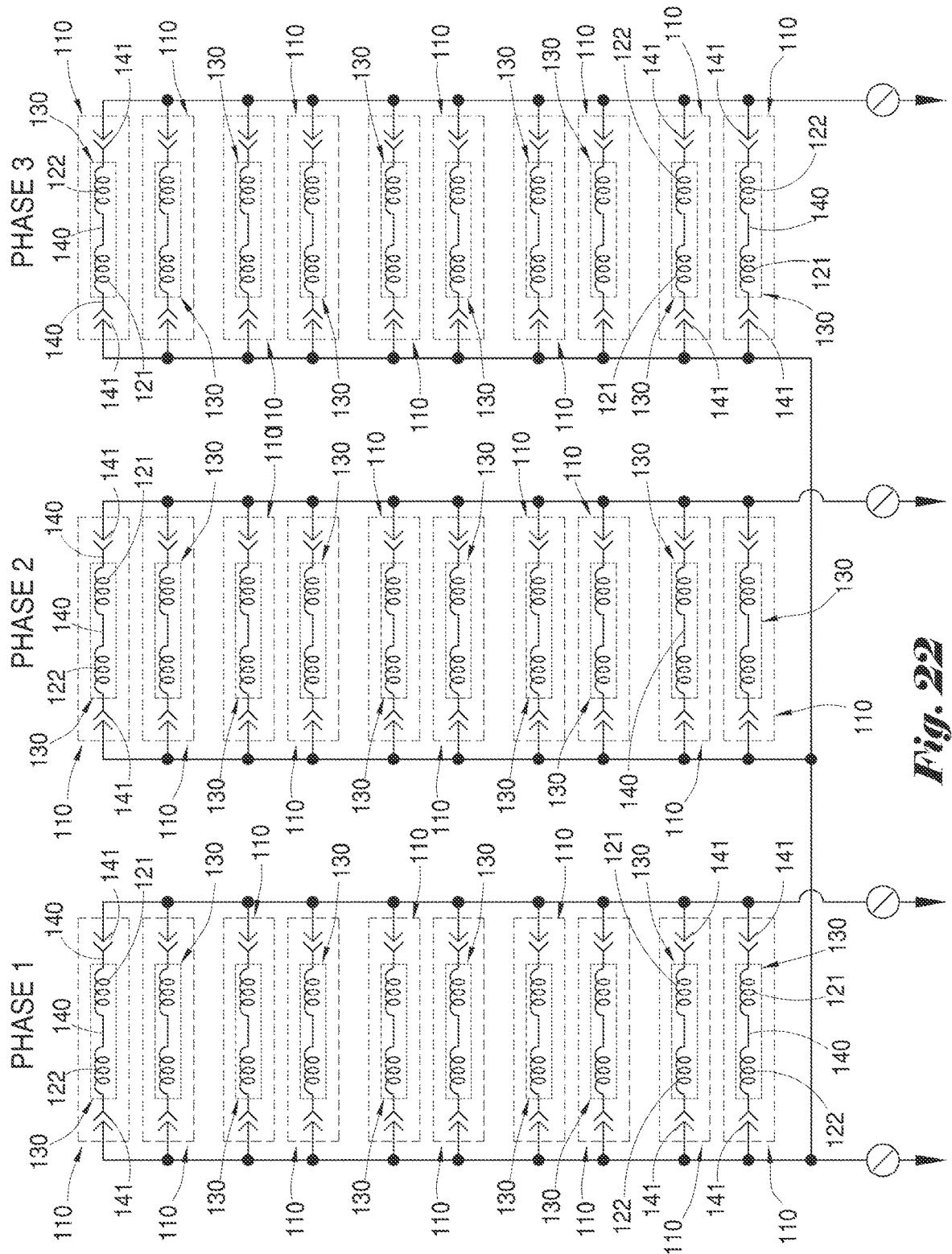
FIG. 22 depicts a schematic view of an exemplary wiring arrangement of an electrical generator assembly of the present invention.

FIG. 22 depicts a schematic view of an exemplary wiring arrangement of an electrical generator assembly of the present invention. Taking into account the 3 Phase, WYE embodiment of the machine, each opposing c-core assembly coil 110 contains a c-core segment 130 with windings 121 and 122 on opposing legs. The windings 121 and 122 are connected in series by a common wire 140. The number of windings will generally dictate the electrical potential generated by the machine. The winding pair 121 and 122 of each coil assembly are terminated at a connector 141 via individual wires 140. This completes the wiring of one single c-core assembly 130. Each c-core assembly 130 is wired in parallel to its opposing c-core assembly. This c-core assembly pair utilizes the dynamic flux pathway and alternating magnetic polarity interaction to generate an alternating electric potential. In this embodiment each third c-core assembly pair (5 pairs in total) are wired in parallel to complete one phase of the circuit. In this embodiment, the remaining 10 c-core assembly pair are wired according to FIG. 22 to comprise the remaining 2 phases of the machine. The ratio of c-core assembly pairs to magnet pairs (15:20) also causes the 3 phases to be 120 degrees out of phase similar to conventional 3 phase generators.

In operation, a motor contained within motor housing 20 applies torque force to rotor shaft 30, thereby causing rotation of said rotor shaft 30. Rotation of said rotor shaft 30 causes rotor disc 10 to rotate within the gap formed between said parallel first stator mounting member 50 and second stator mounting member 70. In a preferred embodiment, an air gap is formed between said rotor disc 10 and inner surface 52 of first stator mounting member 50, as well as between said rotor disc 10 and inner surface 72 of first stator mounting member 70. A plurality of coil assemblies 110 are removably attached to outer surface 51 of said first stator mounting member 50 and outer surface 71 of said second stator mounting member 70. Magnets 80 disposed in rotor disc 10 are generally aligned in corresponding relationship with wire coils 121 and 122 of C-cores 130 of said coil assemblies 110 as previously described herein.

Electrical generator assembly 300 of the present invention generates electricity by rotating concentric rows of multiple magnets 80 in said rotor disc 10 in proximity to corresponding wire coils 121 and 122 of said coil assemblies 110. As this occurs, a dynamic flux pathway is formed between the magnets 80 in rotor disc 10 and opposing coils 121 and 122 of C-cores 130 in said coil assemblies 110. Due to the magnetic pole reversal as said rotor disc 10 turns, said dynamic flux pathway forms in the opposite direction within the assembly, allowing for a naturally produced alternating current signal.

As discussed herein, coil assemblies 110 can be removably mounted to the outer surface 51 of first stator mounting member 50, as well as outer surface 71 of second stator mounting member 70, using fasteners such as elongated bolts 150. It is to be noted that other means for quickly and effectively attaching and removing said coil assemblies 110 (for example, latches, snap locks or other temporary affixing means) can be utilized without departing from the scope of the present invention.

Importantly, individual coil assemblies 110 can be selectively removed from outer surface 51 of said first stator mounting member 50 and/or outer surface 71 of said second stator mounting member 70. In this manner, any of said coil assemblies 110 can be checked, removed, replaced and/or interchanged while the electrical generator assembly 300 of the present invention remains in continuous operation. Put another way, the coil assemblies 110 of the present invention are "hot swappable"; unlike conventional generators, operation of the electrical generator assembly 300 of the present invention need not be paused or interrupted in order to perform such maintenance, inspection or repair. Further, due to its variable speed capability, rotor disc 30 can be rotated at higher rotational speed to make up for any energy loss occurring during periods when any coil assemblies 110 are removed, thereby maintaining substantially constant electricity output and preventing damage to any other components of said generator assembly 300.

The above-described invention has a number of particular features that should preferably be employed in combination, although each is useful separately without departure from the scope of the invention. While the preferred embodiment of the present invention is shown and described herein, it will be understood that the invention may be embodied otherwise than herein specifically illustrated or described, and that certain changes in form and arrangement of parts and the specific manner of practicing the invention may be made within the underlying idea or principles of the invention.

What is claimed:

1. An apparatus for generating electricity comprising:
a) a first coil support member;
b) a second coil support member, wherein said second coil support member is spaced apart from said first coil support member to form a gap between said first and second coil support members;
c) at least one magnet moveably disposed in said gap between said first and second coil support members;
d) a first plurality of coil assemblies removably mounted to said first coil support member;
e) a second plurality of coil assemblies removably mounted to said second coil support member; and
f) a power source configured to move said magnet relative to said first and second pluralities of coil assemblies to generate electricity, wherein at least one of said first plurality of coil assemblies is configured to be selectively removed from said first coil support member without interrupting said generation of electricity.

2. The apparatus of claim 1, wherein at least one of said second plurality of coil assemblies is configured to be selectively removed from said second coil support member without interrupting said generation of electricity.

3. The apparatus of claim 1, further comprising at least one replacement coil assembly configured to be selectively swapped for a coil assembly removed from said first coil support member, without interrupting said generation of electricity.

4. The apparatus of claim 2, further comprising at least one replacement coil assembly configured to be selectively swapped for a coil assembly removed from said second coil support member, without interrupting said generation of electricity.

5. The apparatus of claim 1, wherein each of said coil assemblies further comprises a C-core having a first leg and a second leg.

6. The apparatus of claim 5, wherein each of said C-cores comprises square tubing.

7. The apparatus of claim 5, wherein said coil assemblies further comprise:
a) a first wire coil disposed on said first leg; and
b) a second wire coil disposed on said second leg.

8. The apparatus of claim 7, wherein said first wire coil or said second wire coil comprises copper/silver alloy.

9. The apparatus of claim 1, wherein said first plurality of coil assemblies is mounted to said first coil support member in a substantially circular arrangement in a first plane, and said second plurality of coil assemblies is mounted to said second coil support member in a substantially circular arrangement in a second plane, wherein said first and second planes are oriented substantially parallel to each other.

10. The apparatus of claim 9, wherein said at least one magnet is configured to move in a circular motion within a third plane oriented substantially parallel to said first plane and said second plane.

11. A method of producing electricity comprising:
a) providing a generator comprising:
i) a first coil support member;
ii) a second coil support member, wherein said second coil support member is spaced apart from said first coil support member to form a gap between said first and second coil support members;
iii) at least one magnet moveably disposed in said gap between said first and second coil support members;
iv) a first plurality of coil assemblies removably mounted to said first coil support member;
v) a second plurality of coil assemblies removably mounted to said second coil support member; and
b) moving said at least one magnet within said gap;
c) generating electrical current in said coil assemblies; and
d) selectively removing at least one of said first pluralities of coil assemblies from said first coil support member without interrupting said generation of electricity.

12. The method of claim 11, further comprising selectively removing at least one of said second pluralities of coil assemblies from said second coil support member without interrupting said generation of electricity.

13. The method of claim 11, further comprising swapping at least one coil assembly from said first plurality of coil assemblies with a replacement coil assembly without interrupting said generation of electricity.

14. The method of claim 12, further comprising swapping at least one coil assembly from said second plurality of coil assemblies with a replacement coil assembly without interrupting said generation of electricity.

15. The method of claim 11, wherein each of said coil assemblies further comprises a C-core having a first leg and a second leg.

16. The method of claim 15, wherein said coil assemblies further comprise:
a) a first wire coil disposed on said first leg; and
b) a second wire coil disposed on said second leg.

17. The method of claim 11, wherein said first plurality of coil assemblies is mounted to said first coil support member in a substantially circular arrangement in a first plane, and said second plurality of coil assemblies is mounted to said second coil support member in a substantially circular arrangement in a second plane, wherein said first and second planes are oriented substantially parallel to each other.

18. The method of claim 17, wherein said at least one magnet is configured to move in a circular motion within a third plane oriented substantially parallel to said first plane and said second plane.

19. An apparatus for generating electricity comprising:
a) at least one coil support member;
b) at least one magnet moveably disposed in proximity to said at least one coil support member;
c) a plurality of coil assemblies removably mounted to said at least one coil support member; and
d) a power source for moving said magnet relative to said plurality of coil assemblies to generate electricity, and wherein at least one of said plurality of coil assemblies is configured to be selectively removed from said at least one coil support member without interrupting generation of electricity.

20. The apparatus of claim 19, further comprising at least one replacement coil assembly configured to be selectively swapped for a coil assembly removed from said at least one coil support member without interrupting generation of electricity.

* * * * *